United States Patent
Roichman et al.

(10) Patent No.: US 8,174,742 B2
(45) Date of Patent: May 8, 2012

(54) SYSTEM FOR APPLYING OPTICAL FORCES FROM PHASE GRADIENTS

(75) Inventors: Yohai Roichman, New York, NY (US);
Bo Sun, Elmhurst, NY (US); Yael Roichman, New York, NY (US); Jesse Amato-Grill, Sunnyside, NY (US);
David G. Grier, New York, NY (US)

(73) Assignee: New York University, New York, NY (US)

( * ) Notice: Subject to any disclaimer, the term of this patent is extended or adjusted under 35 U.S.C. 154(b) by 837 days.

(21) Appl. No.: 12/049,107

(22) Filed: Mar. 14, 2008

(65) Prior Publication Data
US 2009/0231651 A1  Sep. 17, 2009

(51) Int. Cl.
*G03H 1/00* (2006.01)
*G02B 5/32* (2006.01)
*H01S 1/00* (2006.01)

(52) U.S. Cl. .................. 359/1; 359/15; 250/251

(58) Field of Classification Search ............... 359/1, 15; 250/251
See application file for complete search history.

(56) References Cited

U.S. PATENT DOCUMENTS

| | | |
|---|---|---|
| 4,649,026 A | 3/1987 | Postle et al. |
| 5,245,466 A | 9/1993 | Burns et al. |
| 5,939,716 A | 8/1999 | Neal |
| 5,989,813 A | 11/1999 | Gerdes |
| 6,055,106 A | 4/2000 | Grier et al. |
| 6,294,063 B1 | 9/2001 | Becker et al. |
| 6,475,639 B2 | 11/2002 | Shahinpoor et al. |
| 6,605,453 B2 | 8/2003 | Ozkan et al. |
| 6,624,940 B1 | 9/2003 | Grier et al. |
| 6,639,208 B2 | 10/2003 | Grier et al. |
| 6,737,634 B2 | 5/2004 | Curtis et al. |
| 6,797,942 B2 | 9/2004 | Grier et al. |
| 6,815,664 B2 | 11/2004 | Wang et al. |
| 6,847,032 B2 | 1/2005 | Grier et al. |
| 6,858,833 B2 | 2/2005 | Curtis et al. |
| 7,033,415 B2 | 4/2006 | Mirkin et al. |
| 7,109,473 B2 * | 9/2006 | Grier et al. .............. 250/251 |
| 7,173,711 B2 | 2/2007 | Dholakia et al. |
| 2002/0108859 A1 | 8/2002 | Wang et al. |
| 2002/0132316 A1 | 9/2002 | Wang et al. |

(Continued)

FOREIGN PATENT DOCUMENTS

CN  1 519 199 A  8/2004

(Continued)

OTHER PUBLICATIONS

Agarwal, et al., "Manipulation and Assembly of Nanowires with Holographic Optical Traps," *Optics Express*, Oct. 2005, pp. 8906-8912. vol. 13, No. 22, Optical Society of America, USA.

(Continued)

*Primary Examiner* — Jade R Chwasz
(74) *Attorney, Agent, or Firm* — Foley & Lardner LLP

(57) ABSTRACT

A system and method for creating extended optical traps for applying optical forces to a material to be manipulated for a commercial application. The system and method include applying a hologram of appropriate characteristics to a beam of light wherein the hologram characteristics include a transverse optical component to apply optical forces transverse to an optical axis of the system. A shape phase component achieves this transverse optical component and also intensity gradient components can be applied via the hologram to provide programmable extended optical traps for a selectable commercial application.

8 Claims, 4 Drawing Sheets

U.S. PATENT DOCUMENTS

| | | |
|---|---|---|
| 2003/0007894 A1 | 1/2003 | Wang et al. |
| 2003/0032204 A1 | 2/2003 | Walt et al. |
| 2003/0132373 A1 | 7/2003 | Curtis et al. |
| 2004/0234264 A1 | 11/2004 | Sasaki et al. |
| 2005/0001063 A1 | 1/2005 | Grier et al. |
| 2005/0037397 A1 | 2/2005 | Mirkin et al. |
| 2005/0058352 A1 | 3/2005 | Deliwala |
| 2005/0094232 A1 | 5/2005 | Kibar |
| 2005/0100351 A1 | 5/2005 | Yuan et al. |
| 2005/0164372 A1 | 7/2005 | Kibar |
| 2005/0173622 A1 | 8/2005 | Curtis et al. |
| 2005/0221333 A1 | 10/2005 | Sundararajan et al. |
| 2005/0259914 A1 | 11/2005 | Padgett et al. |
| 2006/0040286 A1 | 2/2006 | Mirkin et al. |
| 2006/0131494 A1 | 6/2006 | Grier et al. |

FOREIGN PATENT DOCUMENTS

| | | |
|---|---|---|
| EP | 0 517 454 A2 | 12/1992 |
| GB | 2 408 587 A | 6/2005 |
| JP | 6-225750 A | 8/1994 |
| WO | WO 98/04740 A1 | 2/1998 |
| WO | WO 01/35150 A | 5/2001 |
| WO | WO 02/17362 A2 | 2/2002 |
| WO | WO 02/056431 A2 | 7/2002 |
| WO | WO 2004/012133 A2 | 2/2004 |
| WO | WO 2004/100175 A | 11/2004 |
| WO | WO 2005/114151 A1 | 12/2005 |

OTHER PUBLICATIONS

Allen, et al., "Orbital Angular Momentum of Light and the Transformation of Laguerre-Gaussian Laser Modes", Jun. 1992, vol. 45, No. 11, pp. 8185-8190, The American Physical Society, USA.

Arlt, et al., "Generation of a Beam with a Dark Focus Surrounded by Regions of Higher Intensity: The Optical Bottle Beam", Optics Letters, Feb. 15, 2000, pp. 191-193, vol. 25, No. 4, Optical Society of America, USA.

Arlt, et al., "Optical Micromanipulation Using a Bessel Light Beam", Optics Communications, vol. 197, Oct. 1, 2001, pp. 239-245, Elsevier Science B.V., The United Kingdom.

Arrizon, et al., "Accurate Encoding of Arbitrary Complex Fields with Amplitude-Only Liquid Crystal Spatial Light Modulators", Optical Express, Oct. 3, 2005, pp. 7913-7927, vol. 13, No. 20, Optical Society of America, USA.

Ashkin, A., "Optical Trapping and Manipulation of Neutral Particles Using Lasers." Proc. Nat. Acad. Sci., May 1997, pp. 4853-4860, vol. 94, PNAS, USA.

Ashkin, A., "History of Optical Trapping and Manipulation of Small-Neutral Particle, Atoms, and Molecules", IEEE Journal on Selected Topics in Quantum Electronics, Nov./Dec. 2000, pp. 841-856, vol. 6, No. 6, USA.

Ashkin, A., "Laser Manipulation of Atoms", Nature, Dec. 17, 1987, pp. 608-609, vol. 330, Nature Publishing Group, USA.

Ashkin, A., "Optical Trapping and Manipulation of Single Cells Using Infrared Laser Beams." Nature, Dec. 24/31, 1987, pp. 769-771, vol. 330, Nature Publishing Group, USA.

Ashkin, et al., "Observation of a Single-Beam Gradient Force Optical Trap for Dielectric Particles", Optical Letters, May 1986, pp. 288-290, vol. 11, No. 5, Optical Society of America, USA.

Ashkin, et al., "Optical Trapping and Manipulation of Single Living Cells Using Infra-Red Laser Beams." Ber Bunsenges. Phys. Chem., (1989), pp. 254-260, vol. 93, VCH Verlagsgesellschaft mbH, Germany.

Ashkin, et al., Force Generation of Organelle Transport Measured in vivo by an Infrared Laser Trap, Nature, Nov. 22, 1990, pp. 346-348, vol. 348, Nature Publishing Group, USA.

Behrens, et al., "Pair Interaction of Charged Colloidal Spheres Near a Charged Wall." Phys. Rev. E, (2001), pp. 050401-1-050401-4, vol. 64, USA.

Behrens, et al., "The Charge of Glass and Silica Surfaces." J. Chem. Phys. Oct. 8, 2001, pp. 6716-6721, vol. 115, No. 14, American Institute of Physics, USA.

Behrens, et al., "Measuring a Colloidal Particle's Interaction with a Flat Surface Under Nonequilibrium Conditions." Euro. Phys. J. E, Apr. 16, 2003, pp. 115-121, vol. 10, EDP Sciences, Springer-Verlag.

Bengtsson, J., "Kinoforms Designed to Produce Different Fan-Out Patterns for Two Wavelengths", Applied Optics, Apr. 10, 1998, pp. 2011-2020, vol. 37, No. 11, Optical Society of America.

Berg, et al., "A Miniature Flow Cell Designed for Rapid Exchange of Media Under High-Power Microscope Objectives." Journal of General Microbiology, (1984) pp. 2915-2920, vol. 130, Printed in Great Britain.

Berns, M. W., "Laser Scissors and Tweezers." Sci. Am., Apr. 1998, pp. 62-67, vol. 278.

Biancaniello et al., "Colloidal Interactions and Self-Assembly Using DNA Hybridization", Physical Review Letters, Feb. 11, 2005, pp. 058302-1-058302-4, vol. 94, The American Physical Society.

Block, et al., "Compliance of Bacterial Flagella Measured With Optical Tweezers." Nature (1989) pp. 514-518, vol. 338, Nature Publishing Group.

Bonin et al., "Light Torque Nanocontrol, Nanomotors, and Nanorockers," Optics Express Opt. Soc. America USA, Sep. 23, 2002, vol. 10, No. 19, USA.

Born et al., "Principles of Optics—Electromagnetic Theory of Propagation, Interference and Diffraction of Light", Seventh (Expanded) Edition, Cambridge University Press, 1999.

Campbell et al., "Fabrication of Photonic Crystals for the Visible Spectrum by Holographic Lithography." Macmillan Magazines, Ltd., (2000) pp. 53-56.

Chan, C. T., "Quasicrystals Enter Third Dimension" Nature Photonics, Feb. 2007, pp. 91-92, vol. 1, Nature Publishing Group.

Chiou et al., "Interferometric Optical Tweezers", Optics Communications, Jan. 1, 1997, pp. 7-10, vol. 133, Elsevier Science B.V.

Cohn et al., "Approximating Fully Complex Spatial Modulation with Pseudorandom Phase-Only Modulation", Jul. 10, 1994, pp. 4406-4415, vol. 33, No. 20, Optical Society of America.

Courtial, et al., "Observation of the Rotational Frequency Shift for Light with Intrinsic and Orbital Angular Momentum", Quantum Electronics Conference—IQEC 98. Technical Digest, May 3-8, 1998, pp. 139-140, USA.

Crocker et al., "Interactions and Dynamics in Charge-Stabilized Colloid." MRS Bull., (1998), pp. 24-31, vol. 23, USA.

Crocker et al., "Entropic Attraction and Repulsion in Binary Colloids Probed with a Line Optical Tweezer", Physical Review Letters, May 24, 1999, pp. 4352-4355, vol. 82, No. 21, The American Physical Society.

Crocker, et al., "Methods of Digital Video Microscopy for Colloidal Studies," Journal of Colloid and Interface Science, (1996), pp. 298-310, vol. 179, art. No. 0217, USA.

Crocker, et al., "Microscoptic Measurement of the Pair Interaction Potential of Charge-Stabilized Colloid," Physical Review Letters, Jul. 1994, vol. 73, No. 2, pp. 352-355, USA.

Curtis et al., "Dynamic Holographic Optical Tweezers", Optics Communications, Jun. 15, 2002, pp. 169-175, vol. 207, Elsevier Science B.V., USA.

Curtis et al., "Modulated Optical Vortices", Jun. 1, 2003, pp. 872-874, vol. 28, No. 11, Optics Letters, Optics Society of America.

Curtis, et al., "Structure of Optical Vortices", Physical Review Letters, Apr. 4, 2003, pp. 133901-1-133901-4, vol. 90, No. 13, The American Physical Society.

Davis et al., "Encoding Amplitude Information onto Phase-Only Filters", Applied Optics, Aug. 10, 1999, pp. 5004-5013, vol. 38, No. 23, Optical Society of America.

Davis et al., "Encoding Amplitude and Phase Information onto a Binary Phase-Only Spatial Light Modulator", Applied Optics, Apr. 10, 2003, pp. 2003-2008, vol. 42, No. 11, Optical Society of America.

Denis et al., "Direct Extraction of the Mean Particle Size from a Digital Hologram", Applied Optics, Feb. 10, 2006, pp. 944-952, vol. 45, No. 5, Optical Society of America.

Deubel, et al., "Direct Laser Writing of Three-Dimensional Photonic-Crystal Templates for Telecommunications", Nature Materials, Jul. 2004, pp. 444-447, vol. 3, Nature Publishing Group.

Doskolovich, et al., "Design of DOEs for Wavelength Division and Focusing", Journal of Modern Optics, Apr. 15, 2005, pp. 917-926, vol. 52, No. 6, Taylor & Francis.

Duffy, D. C., et al., "Rapid Prototyping of Microfluidic Systems in Poly(Dimethylsiloxane)." *Anal. Chem.*, Dec. 1, 1998, pp. 4974-4984, vol. 70, No. 23, USA.

Dufresne, et al., "Brownian Dynamics of a Sphere Between Parallel Walls", *Europhysics Letters*, Jan. 15, 2001, pp. 264-270, vol. 53, No. 2, EDP Sciences.

Dufresne, et al., "Computer-Generated Holographic Optical Tweezer Arrays." *Rev. Sci. Instr.*, Mar. 2001, pp. 1810-1816, vol. 72, No. 3, American Inst. of Physics, USA.

Dufresne, et al., "Erratum: Interactions, Dynamics, and Elasticity in Charge-Stabilized Colloidal Crystals", *J Chem. Phys.* May 1, 1999, pp. 8845-8845, vol. 110, No. 17, American Inst. of Physics, USA.

Dufresne, et al., "Hydrodynamic Coupling of Two Brownian Spheres to a Planar Surface." *Phys. Rev. Lett.*, Oct. 9, 2000, pp. 3317-3320, vol. 85, No. 15, The American Physical Society, USA.

Dufresne, et al., "Optical Tweezer Arrays and Optical Substrates Created with Diffractive Optics", *Review of Scientific Instruments*, May 1998, pp. 1974-1977, vol. 69, No. 5, American Institute of Physics.

Eriksen, et al., "Fully Dynamic Multiple-Beam Optical Tweezers," *Optics Express*, Jul. 15, 2002, pp. 597-602, vol. 10, No. 14, Optical Society of America, USA.

Escuti et al., "Holographic Photonic Crystals", *Optical Engineering*, Sep. 2004, pp. 1973-1987, vol. 43, No. 9, Society of Photo-Optical Instrumentation Engineers.

Faucheux et al., "Optical Thermal Ratchet", *Physical Review Letters*, Feb. 27, 1995, pp. 1504-1507, vol. 74, No. 9, The American Physical Society.

Faucheux et al., "Periodic Forcing of a Brownian Particle", *Physical Review E*, Jun. 1995, pp. 5239-5250, vol. 51, No. 6, The American Physical Society.

Felgner, et al., "Calibration of Light Forces in Optical Tweezers", *Appl. Opt.*, Feb. 20, 1995, pp. 977-982, vol. 34, No. 6, Optical Society of America, USA.

Finer et al., "Characterization of Single Actin-Myosin Interactions." *Biophys. J.*, Apr. 1995, pp. 291s-297s, vol. 68, Biophysical Society.

Florin, et al., "High-Resolution Axial and Lateral Position Sensing Using Two-Photon Excitation of Fluorophores by a Continuous-Wave Nd:YAG Laser." *Appl. Phys. Lett.*, Jul. 22, 1996, pp. 446-448, vol. 69, No. 4, American Inst. of Physics, USA.

Gahagan et al., "Optical Vortex Trapping of Particles", *Optics Letters*, Jun. 1, 1996, pp. 827-829, vol. 21, No. 11, Optics Society of America, USA.

Gahagan et al., "Simultaneous Trapping of Low-Index and High-Index Microparticles Observed with an Optical-Vortex Trap", *J. Opt. Soc. Am. B*, Apr. 1999, pp. 533-537, vol. 16, No. 4, Optical Society of America, USA.

Gahagan et al., "Trapping of Low-Index Microparticles in an Optical Vortex", *J. Opt. Soc. Am. B*, Feb. 1998, pp. 524-534, vol. 15, No. 2, Optical Society of America, USA.

Ghislain et al., "Measurement of Small Forces Using an Optical Trap", *Rev. Sci. Instrum.*, Sep. 1994, pp. 2762-2768, vol. 65, No. 9, American Inst. of Physics, USA.

Gibson et al., "Free-Space Information Transfer Using Light Beams Carrying Orbital Angular Momentum", *Optics Express*, Nov. 1, 2004, pp. 5448-5456, vol. 12, No. 22, USA.

Gittes et al., "Interference Model for Back-Focal-Plane Displacement Detection in Optical Tweezers" *Optics Letters*, Jan. 1, 1998, pp. 7-9, vol. 23, No. 1, Optical Society of America, USA.

Glückstad et al., "Reconfigurable Ternary-Phase Array Illuminator Based on the Generalised Phase Contrast Method" *Opt. Comm.*, Jan. 1, 2000, pp. 169-175, vol. 173, Elsevier Science B.V.

Goodman, J. W., "Introduction to Fourier Optics", Second Edition, McGraw-Hill, 1996, New York.

Gopinathan, et al., "Statistically Locked-In Transport Through Periodic Potential Landscapes", *Phys. Rev. Lett.*, Apr. 2, 2004, pp. 130602-1-130602-4, USA.

Gopinathan, et al., "Weak Long-Ranged Casimir Attraction in Colloidal Crystals." *Europhys. Lett.*, Feb. 1, 2002, pp. 451-457, vol. 57, No. 3, EDP Sciences.

Grier, D. G., "A Revolution in Optical Manipulation", *Nature*, Aug. 14, 2003, pp. 810-816, vol. 424, Nature Publishing Group.

Grier, D. G., "Colloids: A Surprisingly Attractive Couple", *Nature*, Jun. 18, 1998, pp. 621-623, vol. 393, Macmillan Publishers Ltd.

Grier, D. G., "Optical Tweezers in Colloid and Interface Science", *Cur. Opin. Colloid Interface Sci.*, Feb. 5, 1997, pp. 264-270, vol. 2, USA.

Grier, D. G., "When Like Charges Attract: Interactions and Dynamics in Charge-Stabilized Colloidal Suspensions", *J Phys.: Condens. Matter*, (2000), pp. A85-A94, vol. 12.

Grier, et al., "Anomalous Attractions in Confined Charge-Stabilized Colloid." *J. Phys.: Condens. Matt.*, Apr. 10, 2004, pp. S4145-S4157, vol. 16.

Grier, et al., "Comment on Monte Carlo Study of Structural Ordering in Charged Colloids Using a Long-Range Attractive Potential", *Phys. Rev. E*, Jan. 2000, pp. 980-982, vol. 61, No. 1, The American Physical Society, USA.

Grier, et al., "Holographic Optical Trapping" *Appl. Opt.*, Feb. 10, 2006, pp. 880-887, vol. 45, issue 5, Optical Society of America, USA.

Grier, et al., "Interactions in Colloidal Suspensions: Electrostatics, Hydrodynamics and their Interplay" in "Electrostatic Effects in Biophysics and Soft Matter,"C. Holm et al. (eds), *Electrostatuc Effects in Soft Matter and Biophysics*, (2001), pp. 87-116, Kluwer Academic Publishers, The Netherlands.

Guck et al., "Stretching Biological Cells with Light", *J. Phys.: Condens. Matter*, (2002) pp. 4843-4856, vol. 14, IOP Publishing Ltd., UK.

Guerrero-Viramontes et al., "3D Particle Positioning from CCD Images Using the Generalized Lorenz-Mie and Huygens-Fresnel Theories", *Meas. Sci. Technol.*, (2006) pp. 2328-2334, vol. 17, IOP Publishing Ltd., United Kingdom.

Guidoni et al., "Quasiperiodic Optical Lattices", *Physical Review Letters*, Nov. 3, 1997, pp. 3363-3366, vol. 79, No. 18, The American Physical Society, USA.

Guo, et al., "Optimal Annulus Structures of Optical Vortices", *Optics Express*, Sep. 20, 2004, pp. 4625-4634, vol. 12, No. 19, USA.

Han, et al., "Colloidal Electroconvection in a Thin Horizontal Cell: II. Bulk Electroconvection of Water During Parallel-Plate Electrolysis", *J. Chem. Phys.*, (2006), pp. 144707-1-144707-9, vol. 125, No. 14, American Inst. of Physics, USA.

Han, et al., "Colloidal Electroconvection in a Thin Horizontal Cell I. Microscopic Cooperative Patterns At Low Voltage." *J. Chem. Phys.*, Apr. 22, 2005, pp. 164701-1-164701-11, vol. 122, No. 16, American Inst. of Physics, USA.

Han, et al., "Configurational Temperature of Charge-Stabilized Colloidal Monolayers" *Phys. Rev. Lett.*, Apr. 9, 2004, pp. 148301-1-148301-4, USA.

Han, et al., "Configurational Temperatures and Interactions in Charge-Stabilized Colloid", *J. Chem. Phys.*, (2005), pp. 064907-1-064907-14, American Inst. of Physics, USA.

Han, et al., "Confinement-Induced Colloidal Attractions in Equilibrium" *Phys. Rev. Lett.*, Jul. 18, 2003, pp. 038302-1-038302-4, The American Physical Society, USA.

Han, et al., "Vortex Rings in a Constant Electric Field", *Nature*, Jul. 17, 2003, pp. 267-268, vol. 424, Nature Publishing Group.

Harrison, et al., "Micromachining a Miniaturized Capillary Electrophoresis-Based Chemical-Analysis System on a Chip", *Science*, Aug. 13, 1993, pp. 895-897, vol. 261, USA.

He, et al., "Direct Observation of Transfer of Angular Momentum to Absorptive Particles from a Laser Beam with a Phase Singularity", Jul. 31, 1995, pp. 826-829, vol. 75, No. 5, *Physical Review Letters*, The American Physical Society.

He, et al., "Optical Particle Trapping with Higher-Order Doughnut Beams Produced Using High Efficiency Computer Generated Holograms", *Journal of Modern Optics*, 1995, pp. 217-223, vol. 42, No. 1, Taylor & Francis Ltd.

Heckenberg, N. R., "Laser Beams With Phase Singularities", *Opt. Quantum Elect.*, Sep. 1992, pp. S951-S962, vol. 24, No. 9, Chapman & Hall, USA.

Huang et al., "Optical Tweezers as Sub-Pico-Newton Force Transducers", *Optics Communication*, Aug. 1, 2001, pp. 41-48, vol. 195, Elsevier Science B.V.

Igasaki et al., "High Efficiency Electrically-Addressable Phase-Only Spatial Light Modulator", *Opt. Rev.*, (1999), pp. 339-344, vol. 6, No. 4, Japan.

Jerri, A. J., "The Gibbs Phenomenon in Fourier Analysis, Splines and Wavelet Approximations" *Kluwer Academic Publishers*, (1998), pp. vii-ix.

Joannopoulos et al., "Photonic Crystals: Putting a New Twist on Light", *Nature*, Mar. 13, 1997, pp. 143-149, vol. 386, Nature Publishing Group.

Kaliteevski et al., "Two-Dimensional Penrose-Tiled Photonic Quasicrystals: Diffraction of Light and Fractal Density of Modes", *Journal of Modern Optics*, pp. 1771-1778, 2000, vol. 47, No. 11, Taylor & Francis, Ltd., UK.

Knöner, et al., "Measurement of the Index of Refraction of Single Microparticles", *Phys. Rev. Lett.*, 2006, pp. 157402-1-157402-4, vol. 97, The American Physical Society.

Korda, et al., "Evolution of a Colloidal Critical State in an Optical Pinning Potential." *Phys. Rev. B*, (2002), pp. 024504-1-024504-7, vol. 66, The American Physical Society, USA.

Korda, et al., "Kinetically Locked-In Colloidal Transport in an Array of Optical Tweezers", *Phys. Rev. Lett.*, Sep. 16, 2002, pp. 128301-1 0 128301-4, vol. 89, No. 12, The American Physical Society, USA.

Korda, et al., "Nanofabrication With Holographic Optical Tweezers" *Rev. Sci. Instr.*, Apr. 2002, pp. 1956-1957, vol. 73, No. 4, American Institute of Physics.

Koss et al., "Optical Peristalsis" *Appl. Phys. Lett.*, Jun. 2, 2003, pp. 3985-3987, vol. 82, No. 22, American Institute of Physics.

Kuo, et al., "Force of Single Kinesin Molecules Measured with Optical Tweezers", *Science*, Apr. 9, 1993, pp. 232-234, vol. 260, USA.

Ladavac et al., "Colloidal Hydrodynamic Coupling in Concentric Optical Vortices", *Europhysics Letters*, May 15, 2005, pp. 548-554, vol. 70, No. 4, EDP Sciences.

Ladavac et al., "Microoptomechanical Pumps Assembled and Driven by Holographic Optical Vortex Arrays", *Optics Express*, Mar. 22, 2004, pp. 1144-1149, vol. 12, No. 6, Optical Society of America.

Ladavac et al., "Sorting Mesoscopic Objects with Periodic Potential Landscapes: Optical Fractionation", *Physical Review E*, (2004), pp. 010901-1-010901-4, vol. 70, The American Physical Society.

Ledermann et al., "Three-Dimensional Silicon Inverse Photonic Quasicrystals for Infrared Wavelengthgs", Dec. 2006, pp. 942-945, vol. 5, Nature Publishing Group.

Lee et al., "Flux Reversal in a Two-State Symmetric Optical Thermal Ratchet", *Phys. Rev. E*, (2005), pp. 060102-1 0 060102-4, vol. 71, The American Physical Society, USA.

Lee et al., "Giant Colloidal Diffusivity on Corrugated Optical Vortices" *Phys. Rev. Lett.*, May 19, 2006, pp. 190601-1-190601-4, vol. 96, The American Physical Society, USA.

Lee et al., "Holographic Microscopy of Holographically Trapped Three-Dimensional Structures", *Optics Express*, Feb. 19, 2007, pp. 1505-1512, vol. 15, No. 4, Optical Society of America, USA.

Lee et al., "Observation of Flux Reversal in a Symmetric Optical Thermal Ratchet", *Phys. Rev. Lett.*, Mar. 25, 2005, pp. 110601-1-110601-4, vol. 94, The American Physical Society.

Lee et al., "One-Dimensional Optical Thermal Ratchets", *J Phys.: Condens. Matter*, (2005), pp. S3685-S3695, vol. 17, IOP Publishing Ltd., UK.

Lee et al., "Robustness of Holographic Optical Traps Against Phase Scaling Errors," *Optics Express*, Sep. 19, 2005, pp. 7458-7465, vol. 13, No. 19, Optical Society of America, USA.

Levy et al., "Simultaneous Multicolor Image Formation with a Single Diffractive Optical Element", *Optics Letters*, Aug. 1, 2001, pp. 1149-1151, vol. 26, No. 15, Optical Society of America.

Liesener et al., "Multi-Functional Optical Tweezers Using Computer-Generated Holograms," *Optics Communications*, Nov. 2000, vol. 185, pp. 77-82, Elsevier Science B.V.

MacDonald et al., "Microfluidic Sorting in an Optical Lattice", *Nature*, Nov. 27, 2003, vol. 426, pp. 421-313, Nature Publishing Group.

Man, et al., "Experimental Measurement of the Photonic Properties of Icosahedral Quasicrystals" *Nature*, Aug. 18, 2005, vol. 436, pp. 993-996, Nature Publishing Group.

Manz, A., "Miniaturized Total Chemical Analysis Systems: A Novel Concept for Chemical Sensing" *Sens. Actuators B1*, (1990), pp. 244-248, Elsevier Sequoia, The Netherlands.

Martorell et al., "Spontaneous Emission in a Disordered Dielectric Medium" *Phys. Rev. Lett.*, Feb. 18, 1991, pp. 887-890, vol. 66, No. 7, The American Physical Society, USA.

Martorell et al., "Observation of Inhibited Spontaneous Emission in a Periodic Dielectric Structure" *Phys. Rev. Lett.*, Oct. 8, 1990, pp. 1877-1880, vol. 65, No. 15, The American Physical Society, USA.

Megens et al., "Light Sources Inside Photonic Crystals" *J. Opt. Soc. Am. B*, Sep. 1999, pp. 1403-1408, vol. 16, No. 9, Optical Society of America, USA.

Megens et al., "Comment on Spontaneous Emission of Organic Molecules Embedded in a Photonic Crystal" *Phys. Rev. Lett.*, Dec. 20, 1999, p. 5401, vol. 83, No. 25, The American Physical Society, USA.

Megens et al., "Fluorescence Lifetimes and Linewidths of Dye in Photonic Crystals" *Phys. Rev. A*, Jun. 1999, pp. 4727-4731, vol. 59, No. 6, The American Physical Society.

Meiners et al., "Femtonewton Force Spectroscopy of Single Extended DNA Molecules" *Phys. Rev. Lett.*, May 22, 2000, pp. 5014-5017, vol. 84, No. 21, The American Physical Society.

Mogensen, P.C., "Dynamic Array Generation and Pattern Formation for Optical Tweezers" *Opt. Comm.*, (2000), pp. 75-81, vol. 175, Elsevier Science B.V.

Moh et al., "Multiple Optical Line Traps Using a Single Phase-Only Rectangular Ridge", *Applied Physics B, Lasers and Optics*, 2005, pp. 973-976, vol. 80, Springer-Verlag.

Moreno et al., "Particle Positioning from Charge-Coupled Device Images by the Generalized Lorenz-Mie Theory and Comparison with Experiment", *Applied Optics*, Oct. 1, 2000, pp. 5117-5124, vol. 39, No. 28, Optical Society of America.

Mungan et al., "Determining Pair Interactions from Structural Correlations" *Phys. Rev. B*, Dec. 1998, pp. 14 588-14 593, vol. 58, No. 21, The American Physical Society, USA.

Neuman et al., "Characterization of Photodamage to *Escherichia coli* in Optical Traps" *Biophysical Journal*, Nov. 1999, pp. 2856-2863, vol. 77, Biophysical Society.

Neuman et al., "Optical Trapping", *Review of Scientific Instruments*, Sep. 2004, pp. 2787-2809, vol. 75, No. 9, American Institute of Physics.

Park et al., "Fresnel Particle Tracing in Three Dimensions Using Diffraction Phase Microscopy", *Optics Letters*, Apr. 1, 2007, pp. 811-813, vol. 32, No. 7, Optical Society of America.

Pelton et al., "Characterizing Quantum-Dot Blinking using Noise Power Spectra", *Appl. Phys. Lett.*, Aug. 2, 2004, pp. 819-821, vol. 85, No. 5, American Institute of Physics, USA.

Pelton, et al., "Transport and Fractionation in Periodic Potential-Energy Landscapes", *Physical Review E*, 2004, vol. 70, pp. 031108-1-031108-10, The American Physical Society.

Plewa, et al., "Processing Carbon Nanotubes with Holographic Optical Tweezers", *Optics Express Opt. Soc. America USA*, May 3, 2004, pp. 1978-1981, vol. 12, No. 9, USA.

Polin, et al., "Optimized Holographic Optical Traps", *Optics Express*, Jul. 25, 2005, pp. 5831-5845, vol. 13, No. 15, Optical Society of America.

Polin, et al., "Anomalous Vibrational Dispersion in Holographically Trapped Colloidal Arrays", *Phys. Rev. Lett.*, Mar. 3, 2006, pp. 088101-1-088101-4, The American Physical Society, USA.

Polin, et al., "Colloidal Electrostatic Interactions Near a Conducting Surface" *Phys. Rev. E.*, Oct. 2007, pp. 041406-1-041406-7, The American Physical Society, USA.

Pralle, et al., "Three-Dimensional High-Resolution Particle Tracking for Optical Tweezers by Forward Scattered Light", *Microscopy Research and Technique*, 1999, pp. 378-386, vol. 44, Wiley-Liss, Inc.

Pu et al., "Particle Field Characterization by Digital In-Line Holography: 3D Location and Sizing" *Experiments in Fluids*, 2005, pp. 1-9, vol. 39, Springer-Verlag.

Ray et al., "Precision of Light Scattering Techniques for Measuring Optical Parameters of Microspheres", *Applied Optics*, Sep. 20, 1991, pp. 3974-3983, vol. 30, No. 27, Optical Society of America.

Reicherter, et al., "Optical Particle Trapping with Computer-Generated Holograms Written on a Liquid-Crystal Display", *Optics Letters*, May 1, 1999, pp. 608-610, vol. 24, No. 9, Optical Society of America.

Rodrigo et al., "Four-Dimensional Optical Manipulation of Colloidal Particles", *Applied Physics Letters*, (2005), pp. 074103-1-074103-3, vol. 86, American Institute of Physics, USA.

Rodrigo et al., "Interactive Light-Driven and Parallel Manipulation of Inhomogeneous Particles." *Opt. Express*, Dec. 30, 2002, pp. 1550-1556, vol. 10, No. 26, Optical Society of America, USA.

Roichman et al., "Optical Traps with Geometric Aberrations," *Applied Optics*, May 2006, pp. 3425-3429, vol. 45, No. 15, Optical Society of America, USA.

Roichman et al., "Projecting Extended Optical Traps with Shape-Phase Holography", *Optics Letters*, Jun. 1, 2006, pp. 1675-1677, vol. 31, No. 11, Optical Society of America, USA.

Roichman, Y. "Holographic Assembly of Quasicrystalline Photonic Heterostructures", *Optics Express*, Jul. 11, 2005, pp. 5434-5439, vol. 13, No. 14, Optical Society of America, USA.

Roosen et al., "The $TEM^*_{01}$ Mode Laser Beam—A Powerful Tool for Optical Levitation of Various Types of Spheres", *Optics Communication*, Sep. 1978, pp. 432-436, vol. 26, No. 3, Elsevier Science B.V.

Sasaki et al., "Pattern Formation and Flow Control of Fine Particles by Laser-Scanning Micromanipulation", *Optics Letters*, Oct. 1, 1991, pp. 1463-1465, vol. 16, No. 19, Optical Society of America, USA.

Schonbrun et al., "3D Interferometric Optical Tweezers Using a Single Spatial Light Modulator", *Optics Express*, May 16, 2005, pp. 3777-3786, vol. 13, No. 10, Optical Society of America, USA.

Seeman et al., "Nucleic Acid Nanostructures: Bottom-Up Control of Geometry on the Nanoscale", *Rep. Prog. Phys.*, (2005), pp. 237-270, vol. 68, IOP Publishing Ltd., United Kingdom.

Seldowitz et al., "Synthesis of Digital Holograms by Direct Binary Search", *Applied Optics*, Jul. 15, 1987, pp. 2788-2798, vol. 26, No. 14, Optical Society of America.

Sheng et al., "Digital Holographic Microscope for Measuring Three-Dimensional Particle Distributions and Motions", *Applied Optics*, Jun. 1, 2006, pp. 3893-3901, vol. 45, No. 16, Optical Society of America.

Simmons et al., "Quantitative Measurements of Force and Displacement Using an Optical Trap." *Biophys. J.*, Apr. 1996, pp. 18-13-1822, vol. 70, The Biophysical Society.

Simpson, N. B., "Optical Tweezers and Optical Spanners with Laguerre-Gaussian Modes", *Journal of Modern Optics*, 1996, pp. 2485-2491, vol. 43, No. 12. Taylor & Francis, Ltd.

Sinclair et al., "Assembly of 3-Dimensional Structures Using Programmable Holographic Optical Tweezers", *Optics Express*, Nov. 1, 2004, pp. 5475-5480, vol. 12, No. 22, Optical Society of America, USA.

Singer et al., "Three-Dimensional Force Calibration of Optical Tweezers", *J. Mod. Opt.*, (2000), pp. 2921-2931, vol. 47, No. 14, Taylor & Francis Ltd.

Smith et al., "Optical-trap Force Transducer that Operates by direct Measurement of Light Momentum", *Methods in Enzymology*, (2003), pp. 134-162, vol. 361, Elsevier Science, USA.

Soulez et al., "Inverse Problem Approach in Particle Digital Holography: Out-of-Field Particle Detection Made Possible", Dec. 2007, pp. 3708-3716, vol. 24, No. 12, Optical Society of America.

Soulez et al., "Inverse-Problem Approach for Particle Digital Holography: Accurate Location Based on Local Optimization", Apr. 2007, pp. 1164-1171, vol. 24, No. 4, Optical Society of America.

Sow et al., "Measurement of the Vortex Pair Interaction Potential in a Type-II Superconductor", *Phys. Rev. Lett.*, Mar. 23, 1998, pp. 2693-2696, vol. 80, No. 12, The American Physical Society, USA.

Sundbeck, S., "Structure and Scaling of Helical Modes of Light", *Optics Letter*, Mar. 1, 2005, pp. 477-479, vol. 30, No. 5, Optical Society of America.

Svoboda et al., "Biological Applications of Optical Forces" *Annu. Rev. Biophys. Biomol. Struct.*, Jun. 1994, pp. 247-285, vol. 23, Annual Reviews, Inc., USA.

Svoboda et al., "Direct Observation of Kinesin Stepping by Optical Trapping Interferometry", *Nature*, Oct. 21, 1993, pp. 721-727, vol. 365, Nature Publishing Group.

Swanson et al., "Diffractive Optical Elements for Use in Infrared Systems", *Optical Engineering*, Jun. 1, 1989, pp. 605-608, vol. 28, No. 6, Society of Photo-Optical Instruc. Eng., USA.

Tam, W. Y., "Icosahedral Quasicrystals by Optical Interference Holography", *Appl. Phys. Lett.*, (2006), pp. 251111-1-251111-3, vol. 89, American Institute of Physics, USA.

Terray et al., "Fabrication of Linear colloidal Structures for Microfluidic Applications", *Applied Physics Letters*, Aug. 26, 2002, pp. 1555-15557, vol. 81, No. 9, American Inst. of Physics, USA.

Thompson, B. J., "Holographic Particle Sizing Techniques", *Journal of Physics E: Scientific Instruments*, 1974, pp. 781-788, vol. 7, Great Britain.

Tong et al., "Fluorescence-Lifetime Measurements in Monodispersed Suspensions of Polystyrene Particles", *J. Opt. Soc. Am. B*, Feb. 1993, pp. 356-359, vol. 10, Optical Society of America, USA.

Unger et al., "Monolithic Microfabricated Valves and Pumps by Multilayer Soft Lithography", *Science*, Apr. 7, 2000, pp. 113-116, vol. 288, www.sciencemag.org.

Valignat et al., "Reversible Self-Assembly and Directed Assembly of DNA-Linked Micrometer-Sized Colloids", *PNAS*, Mar. 22, 2005, pp. 4225-4229, vol. 102, No. 12, The National Academy of Sciences, USA.

Vasara et al., "Realization of General Nondiffracting Beams with Computer-Generated Holograms", *J. Opt. Soc. Am. A*, Nov. 1989, pp. 1748-1754, vol. 6, No. 11, Optical Society of America, USA.

Verma et al., "Attractions Between Hard Colloidal Spheres in Semiflexible Polymer Solutions," *Macromolecules*, 2002, vol. 33, pp. 177-186, American Chemical Society, USA.

Verma et al., "Entropic Colloidal Interactions in Concentrated DNA Solutions", *Physical Review Letters*, Nov. 2, 1998. pp. 4004-4007, vol. 81, No. 18, The American Physical Society, USA.

Visscher et al., "Construction of Multiple-Beam Optical Traps with nanometer-Resolution Position Sensing." *IEEE Journal of Selected Topics in Quantum Electronics*, Dec. 1996, pp. 1066-1076, vol. 2, No. 4, Publ. of the IEEE Lasers and Electro-Optics Society.

Weiss et al., "Interactions, Dynamics, and Elasticity in Charge-Stabilized Colloidal Crystals." *J Chem. Phys.* Nov. 15, 1998, pp. 8659-8666. vol. 109, No. 19, American Institute of Physics, USA.

Xu et al., "Icosahedral Quasicrystals for Visible Wavelengths by Optical Interference Holography", *Optics Express*, Apr. 2, 2007, pp. 4287-4295, vol. 15, No. 7, Optical Society of America, USA.

Yin et al., "Transcription Against an Applied Force." *Science*, Dec. 8, 1995, vol. 270, pp. 1653-1657, www.sciencemag.org.

Yu et al., "The Manipulation and Assembly of CuO Nanorods with Line Optical Tweezers", *Nanotechnology*, 2004, pp. 1732-1736, vol. 15, IOP Publishing Ltd. UK.

Zhang et al., "Reconstruction Algorithm for High-Numerical-Aperture Holograms with Diffraction-Limited Resolution", *Optics Letters*, Jun. 1, 2006, pp. 1633-1635, vol. 31, No. 11, Optical Society of America, USA.

Zinkl et al., "Pollen-Stigma Adhesion in *Arabidopsis*: A Species-Specific Interaction Mediated by Lipophilic Molecules in the Pollen Exine", *Development*, (1999), pp. 5431-5440, vol. 126, The Company of Biologists Limited, Great Britain.

* cited by examiner

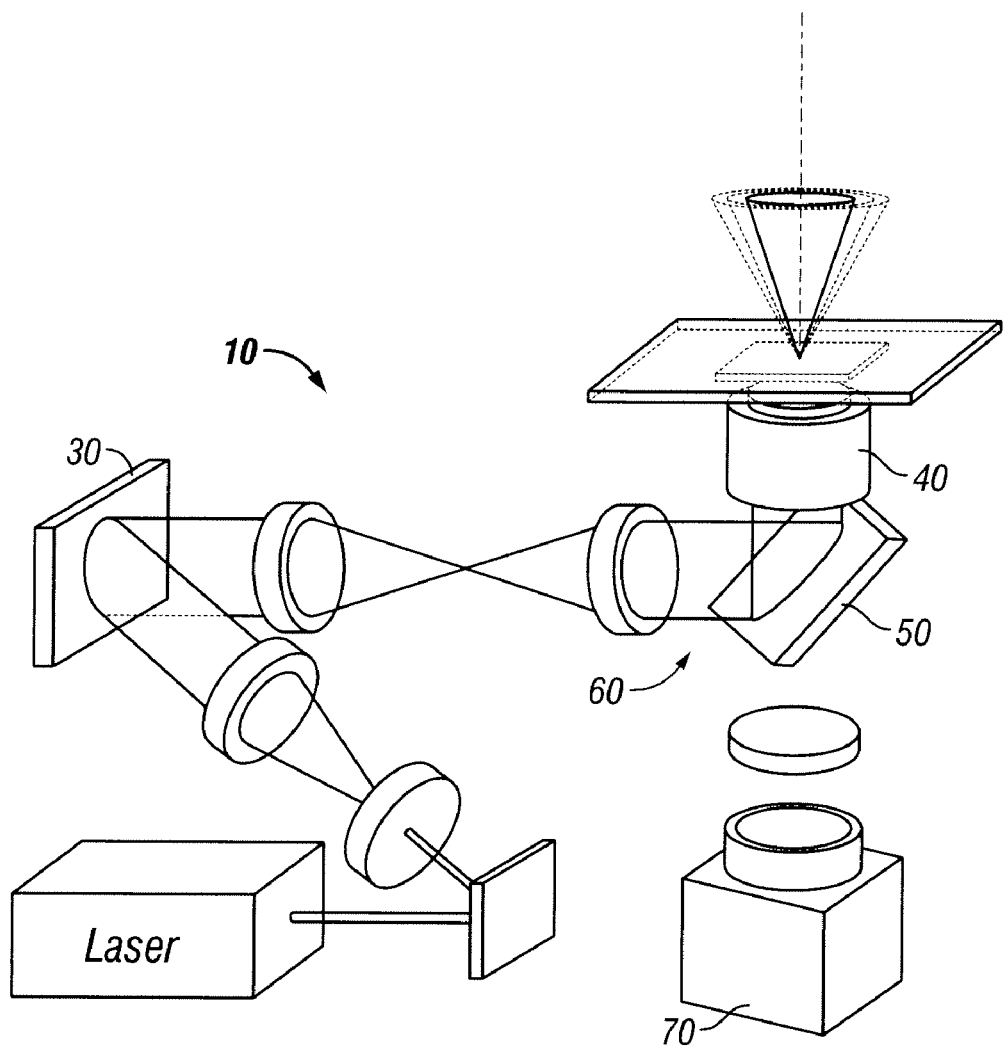
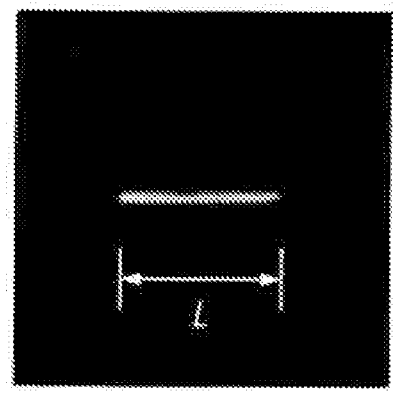
FIG. 2A
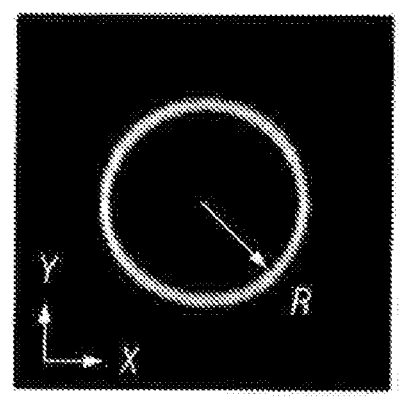
FIG. 2B
FIG. 1

FIG. 4A(1)
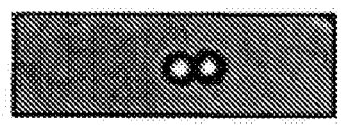
FIG. 4A(2)
FIG. 4B(1)
FIG. 4B(2)
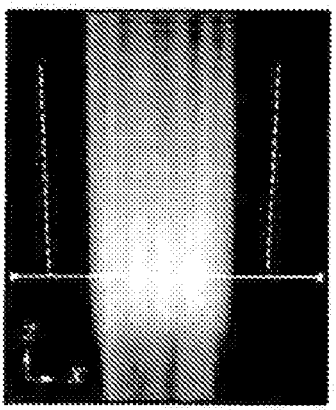
FIG. 4C(1)
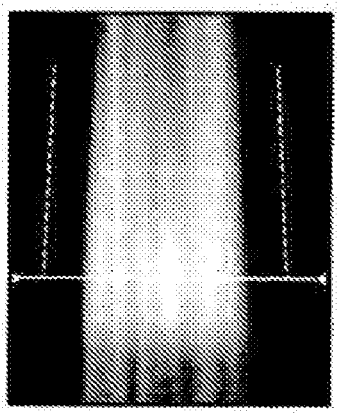
FIG. 4C(2)
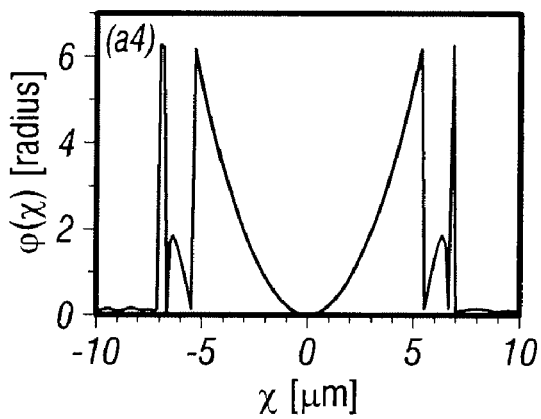
FIG. 4D(1)
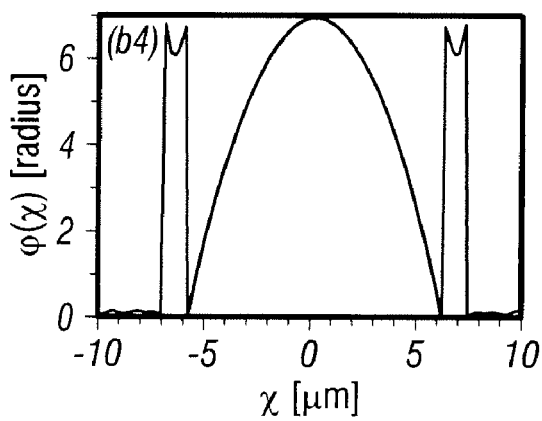
FIG. 4D(2)

US 8,174,742 B2

SYSTEM FOR APPLYING OPTICAL FORCES FROM PHASE GRADIENTS

The United States Government has certain rights in this invention pursuant to a grant from the National Service Foundation through Grant Number DMR-0606415.

This invention is directed toward a system and method for applying optical forces by use of phase gradients. More particularly, the system and method employs phase gradients in a light field to create a new category of optical traps which provide additional features compared to conventional intensity gradient traps (optical tweezers).

BACKGROUND OF THE INVENTION

Optical tweezers have demonstrated substantial value in various commercial applications, such as for example, separation of particles of different characteristics and dynamic manipulation of small objects for numerous, commercial, manufacturing and processing applications. However, optical tweezers do have substantial limitations on the degrees of freedom that can be created, thereby limiting the types and efficiency of forces and manipulations that can be used for demanding commercial applications.

SUMMARY OF THE INVENTION

A method and system have been developed for a new category of optical force by using phrase gradients in place of, or in concert with, light intensity gradients. This new category of optical force enables redirection of electromagnetic radiation pressure to create optical forces transverse to an optical axis. This new type of optical force can be used alone or in combination with conventional longitudinal forces and other intensity gradient profiles to create a useful and versatile tool. These optical forces can establish a highly flexible means to apply virtually any type of force vector to perform commercially important processes, some of which could not previously be accomplished without the advantages of this new type of optical force phase based gradient.

Various aspects of the invention are described hereinafter; and these and other improvements are described in greater detail below, including the drawings described in the following section.

BRIEF DESCRIPTION OF THE DRAWINGS

FIG. 1 illustrates a schematic of a holographic optical trapping system using shape phase holography to project extended traps;

FIG. 2A illustrates an experimentally generated holographic line trap using the system of FIG. 1, the line trap carrying a phase gradient in the $\hat{x}$ direction and imaged in the plane of best focus; FIG. 2B illustrates a focal pattern of a holographic ring trap of l=30 and generated by the system of FIG. 1;

FIG. 4A(1) illustrates a phase gradient barrier for two 1.5 µm diameter silica spheres (the scale bar is 5 µm); FIG. 4A(2) illustrates a phase gradient well in a uniformly bright line trap for the two 1.5 µm diameter silica spheres; FIG. 4B(1) illustrates the phase gradient barrier for uniform in-plane intensity of the focused line; FIG. 4B(2) illustrates the phase gradient well with uniform in-plane intensity of the focused line; FIG. 4C(1) illustrates the phase gradient barrier in an axial section through the measured intensity sharing the intensity divergence due to the phase profile; FIG. 4C(2) illustrates the phase gradient well in a uniformly bright line trap for convergence due to the phase profile; FIG. 4D(1) illustrates the associated designed phase gradient for the configuration of FIG. 4A(1) featuring the desired parabolic profile and off-line phase variations designed to minimize intensity variations and FIG. 4D(2) shows the associated designed phase gradient for the configuration of FIG. 4A(2)

DETAILED DESCRIPTION OF PREFERRED EMBODIMENT

Figure 3:
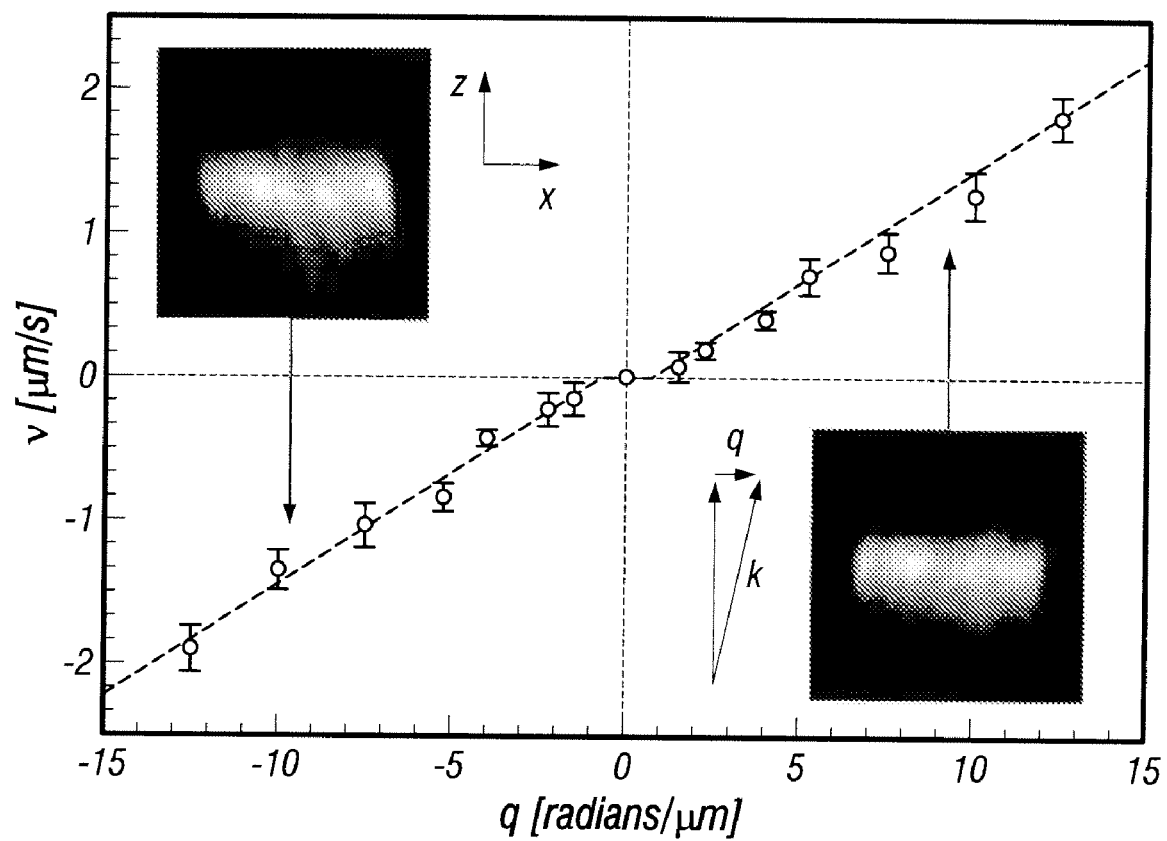
FIG. 3 illustrates dependence of mean velocity, v, on phase gradient, q; the inset images are axial slices in the xz plane through the intensity distribution of the line trap of FIG. 2A at two indicated values of phase gradient, q.

A holographic optical trapping system for performing shape phase holography is shown at 10 in FIG. 1. This system 10 can create optical traps with phase gradients transverse to the optical axis 20, as well as provide optical tweezers created by intensity gradients.

The phase gradients generated by the method described herein can redirect radiation pressure to create optical force fields transverse to the optical axis 20. Photon orbital angular momentum (OAM) is one experimentally realized example of this phenomenon. Phase-gradient forces can be applied by combining them with intensity gradients in holographically projected light fields to create a new category of extended optical traps with tailored force profiles.

The vector potential describing a beam of light of frequency ω and polarization $\hat{\epsilon}(r)$ can be written as $$A(r,t) = u(r)e^{i\Phi(r)}e^{-i\omega t}\hat{\epsilon}(r) \quad (1)$$

where u(r) is the real-valued amplitude and Φ(r) is the real-valued phase. We assume for simplicity that the light is linearly polarized so that $\hat{\epsilon}(r)$ is real. For a plane wave propagating in the $\hat{z}$ direction, Φ(r)=kz, where $k=n_m\omega/c$ is the light's wavenumber, c is the speed of light in vacuum, and $n_m$ is the refractive index of the medium. Imposing a transverse phase profile φ(r) on the wavefronts of such a beam yields, $$\Phi(r) = k_z(r)z + \phi(r), \quad (2)$$

where $\hat{z}\cdot\nabla\phi=0$. The direction of the wavevector, $k(r)=k_z(r)\hat{z}+\nabla\phi$, now varies with position, subject to the constraint $k^2=|k|^2=k_z^2+|\nabla\phi|^2$, which applies in the paraxial limit, $k>>|\nabla\phi|$. The associated electric and magnetic fields are given in the Lorenz gauge by, $$E(r,t) = -\frac{\partial}{\partial t}A(r,t) \text{ and} \quad (3)$$

$$H(r,t) = \frac{1}{\mu}\nabla \times A(r,t),$$

where µ is the magnetic permeability of the medium, which we assume to be homogeneous and isotropic. Following the well known Abraham's formulation, the momentum flux carried by the beam is, $$g(r) = \frac{1}{c^2} \Re\{E^* \times H\} = \frac{k}{n_m \mu c} I(r) \nabla \Phi \quad (4)$$

where $I(r)=|u(r)|^2$ is the light's intensity, and where we have employed the gauge condition, $\nabla \cdot A=0$.

The momentum flux separates into an axial component $g_z(r)=kk_z I(r)(n_m \mu c)^{-1}\hat{z}$ and $$g_\perp(r) = \frac{k}{n_m \mu c} I(r) \nabla \varphi \quad (5)$$

transverse to the optical axis 20, which is responsible for transverse forces.

It has been recognized that the helical phase profile, $\phi(r)=l\theta$, imbues a beam of light with an OAM flux, $r \times g_\perp$, amounting to 1 per photon. Here, $\theta$ is the azimuthal angle around the optical axis, and l is an integer describing the wavefronts' helical pitch. This OAM is distinct from the photons' intrinsic spin angular momentum. Through it, even linearly polarized light can exert a torque around the optical axis. Equation (5) reveals this to be a manifestation of the more general class of transverse forces arising from phase gradients.

Intensity gradients also exert forces on illuminated objects. In this case, the dipole moment induced in the object responds to gradients in the field, yielding a force proportional to the gradient of the intensity, which therefore is manifestly conservative. For a small sphere of radius a, the intensity-gradient force has the form, $$F_\nabla(r) = n_m \frac{k^2 a^3}{2} \left(\frac{m^2-1}{m^2+2}\right) \nabla I, \quad (6)$$

where $m=n_p/n_m$, is the ratio of the particle's refractive index, $n_p$, to the medium's, $n_m$. Unlike g, $F_\nabla$ can be directed up the optical axis. The resulting axial restoring force is the basis of single-beam optical traps.

Because beams of light have gradients in both the intensity and the phase, the total optical force is not conservative. This is evident because, $$\nabla \times g = \frac{k}{\mu n_m} (\nabla I) \times (\nabla \Phi) \quad (7)$$

does not vanish in general. Although it is known that optical traps exert non-conservative forces, subsequent reports have treated optical tweezers as (conservative) potential energy wells.

Phase-gradient forces can thus be created using a new class of extended optical traps created through shape-phase holography. The system 10 shown schematically in FIG. 1, uses a phase-only spatial light modulator 30 (SLM) (Hamamatsu X8267-16) to imprint computer-generated programmable holograms on a laser beam (Coherent Verdi 5W) at a vacuum wavelength of 532 nm. The modified beam is relayed to an objective lens 40 (Nikon Plan Apo, 100× oil immersion, NA 1.4) that focuses it into the intended three-dimensional optical trapping pattern. A beam splitter 50 reflects the laser light 60 into the objective's input pupil while allowing images at other wavelengths to pass through to a video camera 70 (NEC TI-324AII).

The holograms designed for this study bring the laser light 60 to a focus along one-dimensional curves, C, embedded in the three-dimensional focal volume of the objective lens 40. Each hologram also encodes a designated intensity profile I(s) and phase profile $\phi(s)$ along the arclength s of C. This is accomplished by numerically back-projecting the desired field along C onto the plane of the SLM 30 to obtain the ideal complex-valued hologram, $\psi(r)=|b(r)|\exp(ip(r))$. An appropriate shape-phase algorithm assigns the phase shifts p(r) to the SLM's pixels with a probability proportional to |b(r)|. An alternate phase pattern imprinted on the unassigned pixels diverts excess light away from C.

The images in FIGS. 2A and 2B show a focused line trap and ring trap, respectively, each designed to have uniform intensity and phase gradients. These images were obtained by placing a mirror in the microscope's focal plane and imaging the reflected light. Because the holograms come to a diffraction-limited focus, their axial intensity gradients are steep enough to trap particles in three dimensions. To study the phase-gradient force predicted by Eq. (5), we track colloidal spheres moving along these traps.

In the case of the line trap, we first subjected the trapped particle to linear phase gradients, $\nabla \phi = q$ x, over the range $q=\pm 12$ radians/µm. The insets to FIG. 3 show axial sections through volumetric reconstructions of the trap's three-dimensional intensity distribution for two different values of q. The diffraction-limited focal line remains in the xy plane despite the imposed phase gradient. The beam's direction of propagation, however, deviates from $\hat{z}$ by the angle $\sin^{-1}(q/k)$. This tilt directs a component of the beam's radiation pressure along x. The images in FIG. 3 confirm the phase gradients' magnitude and uniformity.

The line trap was projected into an aqueous dispersion of colloidal silica spheres $2a=1.53$ µm in diameter sealed into the 40 µm thick gap between a glass microscope slide and a #1 glass coverslip. Focusing the trap near the sample's midplane avoids reflections from the glass-water interface and minimizes hydrodynamic coupling to the walls. Equation (5) and the Stokes mobility law for a colloidal sphere then suggest that a trapped particle's speed, v, should be proportional to q.

To test this prediction, we measured the time required for a single sphere to travel the length, L=5 µm, of a 100 mW trap as the sign of q was flipped 20 times for each value of |q|. The observed root-mean-square off-line excursions of roughly 200 nm suggest equal axial and lateral trap stiffnesses comparable to those of a point-like optical tweezer powered by 1 mW. Under these conditions, the trapped sphere traveled along the line at speeds up to 2 µm/s when subjected to the largest phase gradients. Results obtained by systematically varying q are plotted in FIG. 3. They show the anticipated linear dependence, except very near q=0, where phase-gradient forces are too weak to overcome localized pinning centers created by small uncorrected intensity variations.

More complicated phase gradients give rise to more interesting physical effects demonstrating the versatility of the use of phase gradients. The particles shown in FIGS. 4A(1) and 4A(2) also are trapped along a uniformly bright line trap of length L=10 µm. This line, however, has a parabolic phase profile, $\phi(x)=\pm(qx)^2$, that is predicted to force objects either out to the ends of the line or toward its center depending on the sign. The images in FIG. 4A(1)-4D(2) demonstrate both effects for a pair of trapped colloidal spheres. Axial sections in FIGS. 4C(1) and 4C(2) through the three-dimensional intensity distribution show that the phase-gradient barrier results from light diverging along the line's length, while the well results from the projection of converging rays. FIGS. 4D(1) and 4D(2) show the designed phase gradient conditions featuring the designed parabolic profile and off-line phase variations so as to minimize intensity variations (FIG. 4D(1) is correlated to FIG. 4A(1) and FIG. 4D(2) correlated to FIG. 4A(2)). So long as the particles are rigidly confined to the uniformly bright focal line, Eq. (7) suggests that the phase-gradient force approximates a conservative potential energy landscape.

Figure 5A:
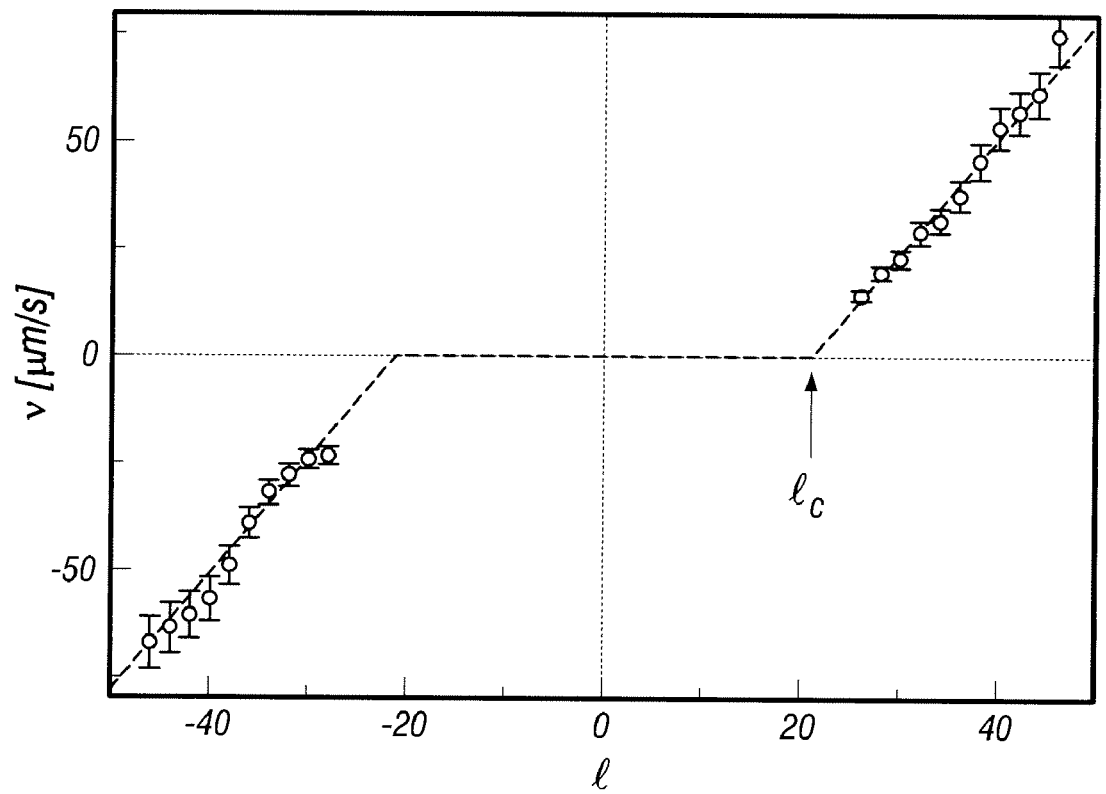
FIG. 5A is a plot of particle velocity, v, versus topological charge, l, where data points show the peak velocity v of a single one of the colloidal silica sphere particles circulating around a ring shape (see FIG. 5C)
Figure 5B:
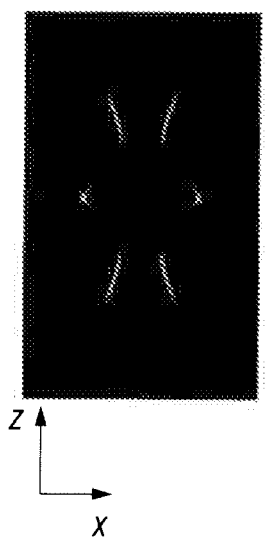
FIG. 5B shows a computed axial section through a holographic ring trap of radius R=20 µm and helocity l=30.
Figure 5C:
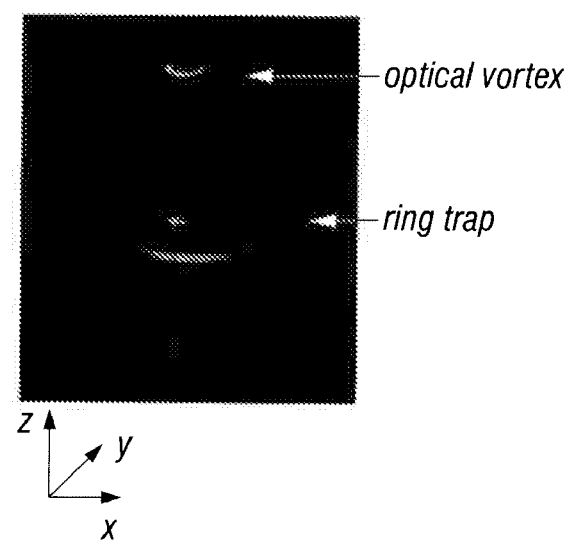
FIG. 5C illustrates a volumetric representation of the measured three-dimensional intensity field in a holographic ring trap of radius R=20 µm and l=10.

Like holographic line traps, holographic ring traps, such as the example in FIG. 2B, can be endowed with arbitrary phase profiles, including the uniform azimuthal phase gradient, $\phi(r)=l\theta$, that defines a helical mode. A helical profile, by itself, causes a beam to focus into a ring of light, forming a torque-exerting optical trap known as an optical vortex. Whereas the radius of an optical vortex, $R_l$, is proportional to its helicity, holographic ring traps can be projected with any desired radius, R, independent of l. This advantageously facilitates many applications, such as colloidal transport under varying phase gradients and many complex process steps. Also unlike optical vortices, holographic ring traps have strong enough axial intensity gradients to trap objects in three dimensions. This can be seen in the computed axial section in FIG. 5B in which the trap appears as two bright focal spots on the midline. Imposing a helical phase profile on a ring trap suppresses the beam's axial intensity through destructive interference, diverting it instead to a radius, $R_l$ from the axis. If the ring's radius R exceeds the vortices', $R_l$, the converging helical beam focuses not only to the intended ring trap, but also to two conventional optical vortices above and below the focal plane, which appear as bright features in FIG. 5B. This structure also is evident in the ring trap's measured three-dimensional intensity field in FIG. 5C. The optical vortices' comparatively weak axial intensity gradients are evident in FIG. 5B.

A ring trap with a uniform azimuthal phase gradient exerts a torque about its axis. We demonstrated this by tracking a colloidal silica sphere circulating around a holographic ring trap of radius R=2.6 μm projected into the midplane of a 40 μm thick sample. The trapped particle was subjected to azimuthal phase gradients in the range l=±50, and its peak speed was measured to within 10% for each value of the helicity. The results are plotted in FIG. 5A.

Like optical vortices, holographic ring traps carrying orbital angular momentum are subject to 1-fold and 2 1-fold azimuthal intensity variations due to non-ideal phase scaling that trap the particle for $|l|<l_c$. For $|l|>l_c$, however, the particle's peak speed increases linearly with $|l|$, consistent with the predictions of Eq. (5). Intermittent circulation near $|l|=l_c$ gives rise to large velocity fluctuations characterized by giant enhancement of the particle's effective diffusion coefficient. Disorder in the effective force landscape also gives rise to interesting collective dynamics for multiple particles trapped on the ring, including transitions among periodic, chaotic and weakly chaotic steady states. Phase-gradient forces in holographic ring traps therefore provide useful model systems for studying fundamental problems in nonequilibrium statistical mechanics. They also can provide numerous practical applications as the basis for microscopic pumps, mixers, and optomechanical micromachines. Azimuthal phase gradients also can be used to endow a holographic ring trap with more complicated force profiles, even if the ring's intensity is uniform.

Phase gradients in a beam of light can thus give rise to forces transverse to the optical axis, and these forces can be harnessed for a new type of optical trap. Tuning optical traps' force profiles with phase gradients will be useful for manipulating microscopic objects, and will greatly facilitate rapid measurements of colloidal interactions, for example. Although phase-gradient forces generally are non-conservative, they can act as conservative force fields on appropriately restricted manifolds. More generally, optical forces' non-conservativity can engender useful attributes in illuminated particles' dynamics, including departures from Boltzmann statistics for systems nominally in equilibrium. Phase gradients can also give rise to spatial variations in the polarization. Although optically isotropic materials are not influenced by polarization gradients, anisotropic materials can be. Phase-directed polarization gradients can be tailored and therefore should provide additional independent avenues for controlling microscopic systems.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments, and with various modifications, as are suited to the particular use contemplated.

What is claimed is:

1. A method for creating extended optical traps for applying optical forces to a material for performing a commercial application, comprising:
    applying a hologram to a beam of light wherein the hologram creates a shaped phase optical trap by specifying a vector potential along a particular curve in three dimensions, which provides transverse optical forces relative to an optical axis and for a holographic ring trap made of the shaped phase optical trap, the hologram is independent of any helicity, and
    applying the transverse optical force to the material to carry out the commercial application.

2. The method as defined in claim 1 further including providing the hologram with an intensity gradient component to create the shaped phase optical trap with both a phrase gradient and an intensity, or amplitude, gradient component for a one dimensional form of the vector potential.

3. The method as defined in claim 1 wherein the shaped phase optical trap includes photo orbital angular momentum.

4. The method as defined in claim 1 wherein the shaped phase optical trap includes tailored force profiles to accomplish the commercial application.

5. The method as defined in claim 4 wherein the hologram further includes an intensity gradient component which for a small sphere of radius "a" comprises a force:

$$F_\nabla(r) = n_m \frac{k^2 a^3}{2} \left( \frac{m^2 - 1}{m^2 + 2} \right) \nabla I$$

where $m = n_p/n_m$ with $n_p$ an index of refraction of the material and $n_m$, an index of refraction of a surrounding medium.

6. The method as defined in claim 4 wherein the hologram is provided using a phase-only optical light modulator.

7. The method as defined in claim 4 further including the step of using an objective lens downstream from where the hologram is applied to modify the light beam, thereby creating an extended optical trap having both the transverse optical forces and intensity gradient forces.

8. A method for creating extended optical traps for applying optical forces to a material for performing a commercial application, comprising:

applying a hologram to a beam of light wherein the hologram creates a shaped phase optical trap which includes tailored force profiles and further includes a component which provides to the beam of light a momentum flux component transverse to an optical axis comprising:

$$g_\perp(r) = \frac{k}{n_m \mu c} I(r) \nabla \varphi$$

where k = value of wave vector k
$n_m$ = refractive index of a medium
c = speed of light
$\varphi$ = phase
$\mu$ = magnetic permeability
I(r) = light intensity
$\nabla \varphi$ = phase profile gradient applying the transverse optical force to the material to carry out the commercial application.

* * * * *